Aug. 23, 1966 R. T. BURNETT 3,268,034
SPOT TYPE DISC BRAKE
Filed May 7, 1962 4 Sheets-Sheet 1

INVENTOR.
RICHARD T. BURNETT
BY
Sheldon F. Raizes
ATTORNEY

Aug. 23, 1966 R. T. BURNETT 3,268,034
SPOT TYPE DISC BRAKE

Filed May 7, 1962 4 Sheets-Sheet 3

INVENTOR.
RICHARD T. BURNETT
BY
Sheldon F. Raye
ATTORNEY

Aug. 23, 1966    R. T. BURNETT    3,268,034
SPOT TYPE DISC BRAKE

Filed May 7, 1962    4 Sheets-Sheet 4

$A_2 = 1.32 F_1$
$A_1 = .44 F_1$ $A_1 = A_2 = APPROX .6F$

INVENTOR.
RICHARD T. BURNETT
BY
Sheldon F. Raizes
ATTORNEY

United States Patent Office 3,268,034
Patented August 23, 1966

1

3,268,034
SPOT TYPE DISC BRAKE
Richard T. Burnett, South Bend, Ind., assignor to The Bendix Corporation, a corporation of Delaware
Filed May 7, 1962, Ser. No. 192,857
5 Claims. (Cl. 188—73)

This invention relates to a disk brake and more particularly, to a brake of the caliper type wherein the caliper is mounted on its support member in such a way that friction members carried by said caliper are able to fully engage the rotor of the brake.

One of the disadvantages of many disk brakes is the brake shoes or friction members of the disk brake are not able to properly align themselves with the friction surface of the brake rotor resulting in uneven wear of the brake shoes, dragging, and twisting strain on the caliper the support and the connection between the caliper and support. To prevent as much as possible of the above disadvantage, tolerances must be carefully watched and the brake must be carefully aligned when mounted on a vehicle; therefore resulting in an added expense which is substantial when considered with the total cost.

An object of this invention is to provide a brake which permits optimum alignment between friction members and a brake rotor.

One of the objects of the invention is to provide a disk brake which dispenses with many of the tolerances of manufacture heretofore necessary and which can be mounted to a vehicle with a decrease in many aligning problems previously encountered.

Another object of the invention is to provide a caliper disk brake wherein a housing is swivelably mounted to its support member.

Still another object of the invention is to provide a caliper disk brake wherein a housing is swivelably mounted to two links wherein each link is pivotally mounted to a support member.

A further object of the invention is to provide a brake wherein two pins support a brake shoe and take equal reaction force upon actuation of the brake.

An overall object of this invention is to provide a caliper brake, which is simple in construction and economical to manufacture, including means for allowing full engagement of the brake shoe or friction members with the friction surface of the rotor and still maintain efficient braking.

A full understanding of the invention may be had from the following detailed description with reference to the accompanying drawings, wherein.

Figure 1:
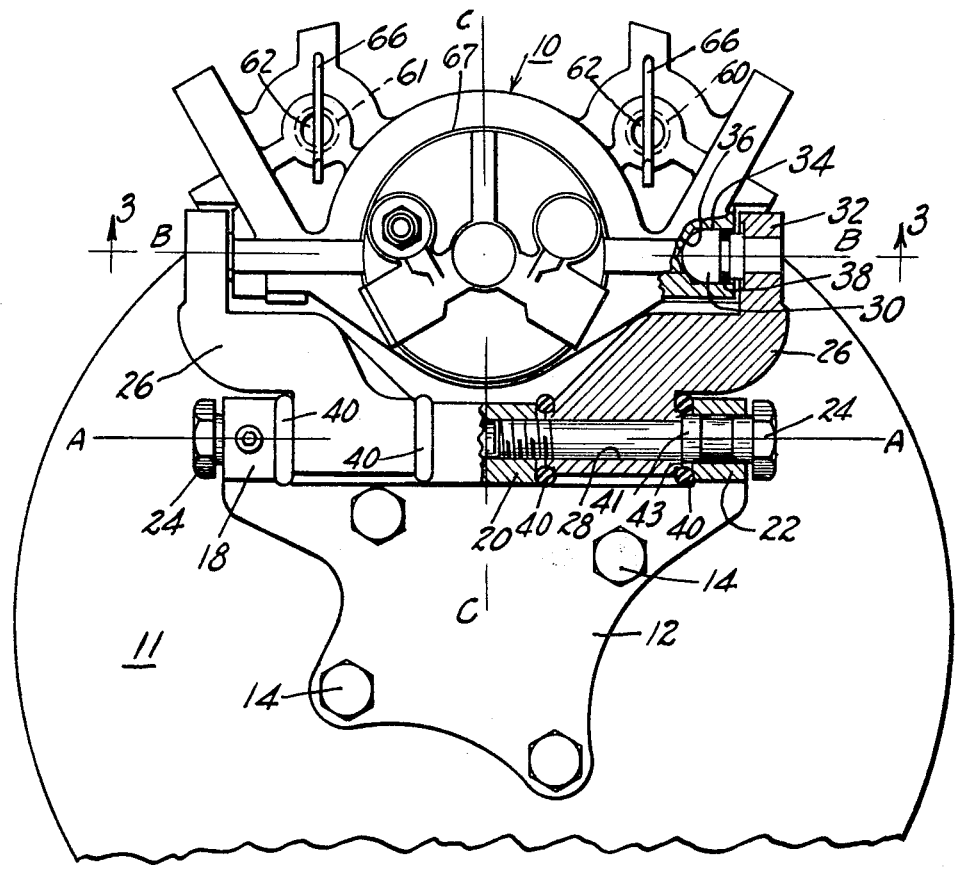
FIGURE 1 is an elevational front view of the caliper brake partially cut away to illustrate a feature of the invention.

Referring to FIGURES 1 through 5, a caliper housing 10 is mounted on a support bracket 12 which is in turn mounted by bolts 14 to a stationary part of the vehicle which may be, for example, a spindle 16. The caliper housing 10 straddles a rotor 11 having friction faces 13 and 15 thereon. The support bracket 12 has formed integrally therewith, ears 18, 20 and 22, each of which has aligned openings therein for receiving bolts 24. Links 26 each have an opening 28 at one end thereof for receiving the bolt 24 and are pivotally mounted on the bolt 24 to the bracket 12 for pivotal movement about an axis A—A. Each link 26 has force fitted therewith a bearing member 30, shaped as a sector of a sphere, extending from the other end 32. The housing 10 has an opening 34 at each of its circumferentially spaced ends for receiving the bearing member 30. Each opening 34 has surfaces 36 which bear on the spherical portion of the bearing member 30 for swivelable movement thereon. It should be understood that the bearing members could be carried by the housing and the links 26 could have complementary openings therein. Thus, it can be seen that the housing 10 can pivot about the axis A—A and axis B—B and since each link 26 can pivot about the axis A—A independently of each other and the housing 10 is swivelable on the bearing member 30, the housing 10 can pivot about an axis C—C.

To avoid having a great deal of friction in pivotable movement between the links 26 and bolts 24 and between the surfaces 36 and bearing member 30, the frictional connections should be thoroughly lubricated at all times and be protected from contaminants. Therefore, an O-ring 38 is placed in a groove of the bearing member 30 and O-rings 40 are placed between the ears of the support bracket 12 and each link 26 to prevent loss of lubricant and to prevent contaminants from collecting in the connections.

To prevent rattling of the housing on the support member, the links 26 are adjustable axially along the axis A—A to provide for a snug fit thereby allowing the links 26 to freely rotate on the support bracket 12 and the housing 10 to freely swivel on the bearing members 30. Each bolt 24 has an annular flange 41 which abuts an end shoulder 43 of each link 26. Adjustment of the links 26 is effected by the engagement of the flange 41 with the shoulder 43 during rotation of the bolt 24.

A pair of brake shoes 42 and 44 are carried by the housing 10 and are disposed on each side of the rotor for engagement therewith. The brake shoes 42 and 44 comprise a backing plate 46 and 48, respectively, and friction linings 50 and 52 attached to their respective backing plates. The brake shoe 42 is rigidly connected to legs 54 of the housing 10 by bolts 56 and the backing plate 48 of brake shoe 44 has two openings 58 and 63 therein. Rods 60 and 61 extend through the openings 62 of the housing 10, the openings 58 and 63 of the backing plate 48 and into openings 64 into legs 54; the rod 60 being rotatably mounted in its opening 58 for purposes to be described hereinafter. A pin 66 is provided to retain each rod from axial movement. The brake shoe 44 is slidably mounted on the rods 60 and 61 and therefore slidable relative to the housing 10.

OPERATION

A chamber 67 of the housing 10 contains a piston 69 for actuating the brake through hydraulic pressure. Upon actuation of the brake, the piston 69 will thrust brake shoe 44 against its respective rotor friction face 13 and then further build up of pressure will result in moving the housing in a generally axial direction, due to the pivoting of links 26 on the support bracket 12, thereby bringing the other brake shoe 42 into engagement with its respective rotor surface 15. Assuming that the face of the rotor is not perpendicular to its axis but is warped slightly and tends to be in a plane designated by a line D—D (FIGURE 3), or line E—E (FIGURE 5), or both, then without applicant's construction the lining 52 would engage the rotor mainly in the vicinity of F and G and the lining 50 would engage the rotor mainly in the vicinity of H and I. Thus, the linings will wear unevenly, utilization of the full lining surface in braking will not be achieved, and a twisting strain will be exerted by the rotor through the friction linings and their backing plates to the housing 10 and its connections to the support plate 12. However, applicant's construction alleviates the above conditions, since the housing can pivot about an axis B—B to allow the housing and friction members to align vertically with the rotor friction faces (therefore plane E—E) and the housing can pivot about axis C—C to align the housing and friction members with the rotor friction faces horizontally (therefore plane D—D) thus providing full engagement of the brake linings 44 and 46 with their respective rotor friction faces.

BRAKE SHOE SUPPORT ROD AND SHOE BACKING PLATE

Figure 6:
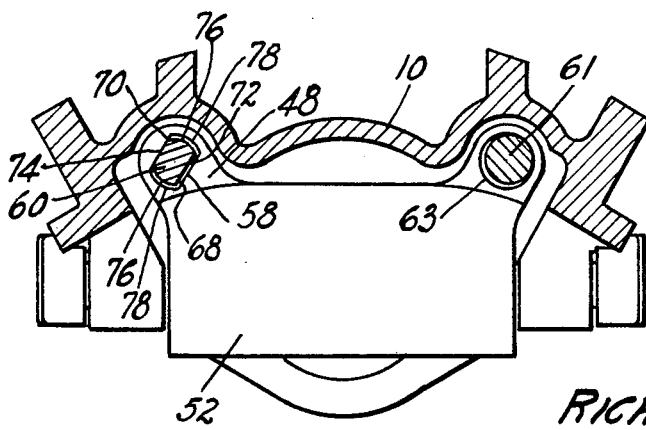
FIGURE 6 is a view taken along section line 6—6 of FIGURE 4.
Figure 2:
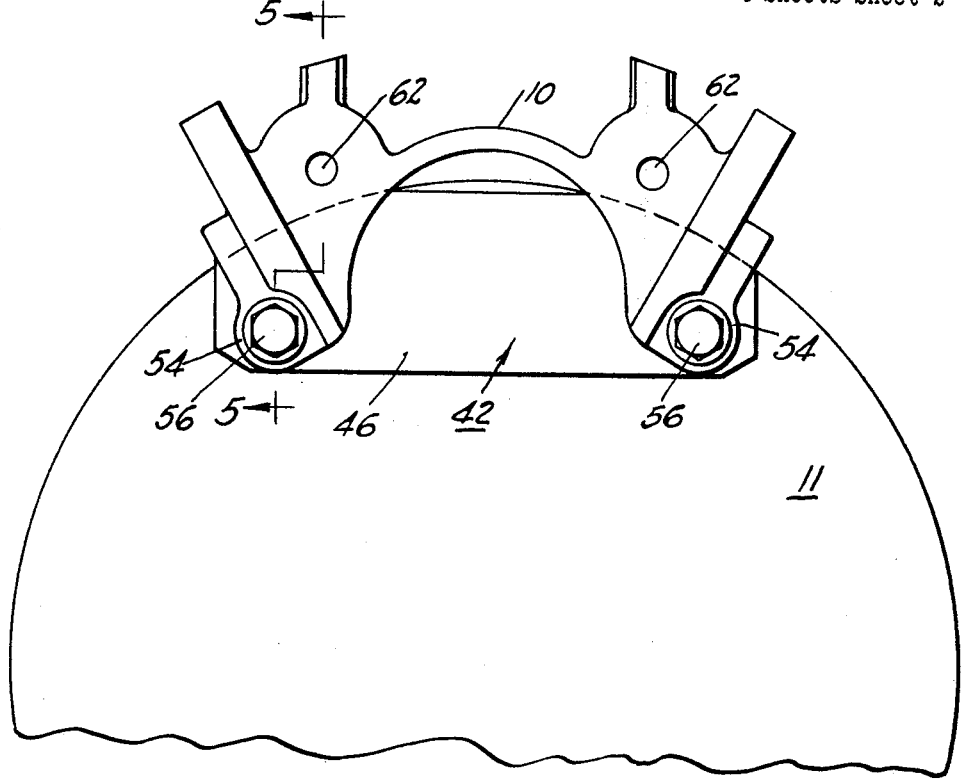
FIGURE 2 is a rear elevational view of the caliper brake.
Figure 3:
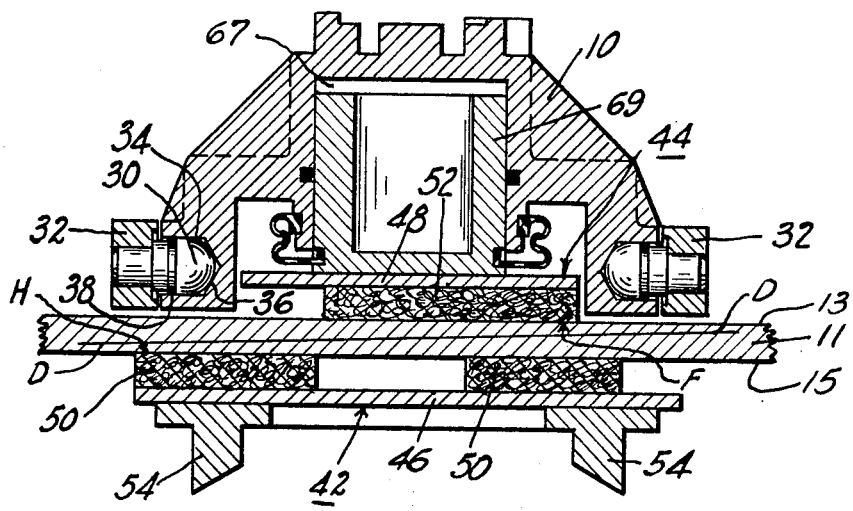
FIGURE 3 is a view taken along section line 3—3 of FIGURE 1.
Figure 4:
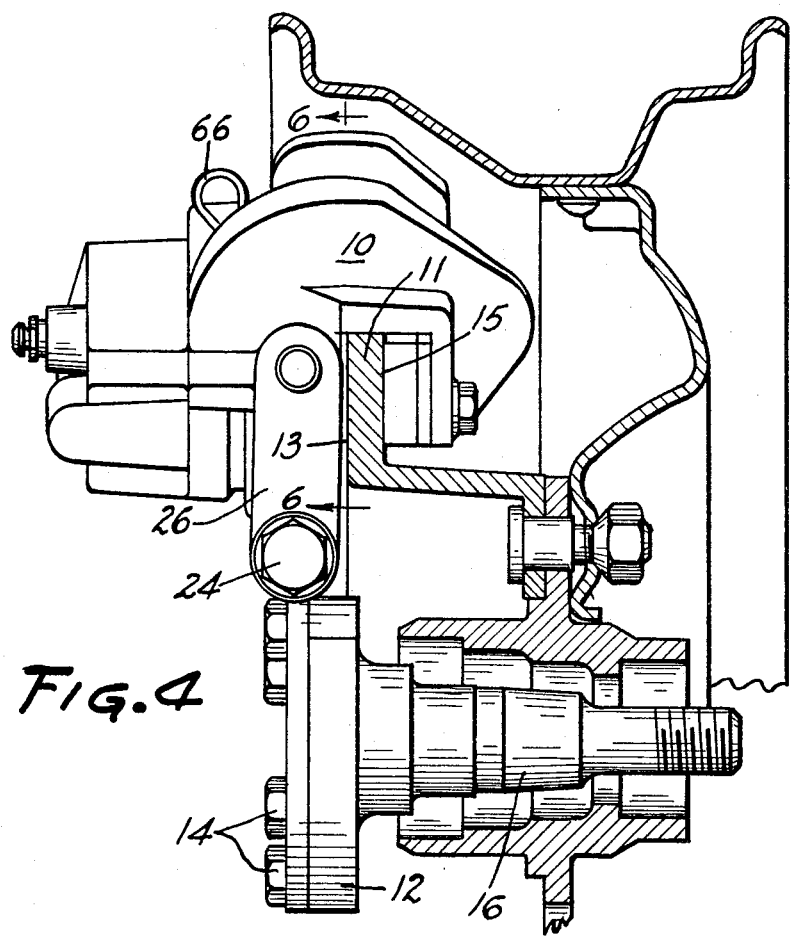
FIGURE 4 is a side elevational view of FIGURE 1.
Figure 5:
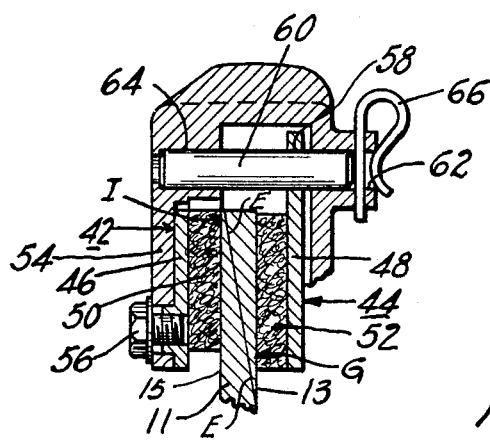
FIGURE 5 is a view taken along section line 5—5 of FIGURE 2.

With reference to FIGURE 6, the particular shapes of the rod 60 and the opening 58 are illustrated. It can be seen that the opening 58 of the backing plate 48 has two parallel edges 68 and 70 and the rod 60 has two parallel faces 72 and 74 extending longitudinally thereof which are complementary to the edges 68 and 70 of the opening 58 of the backing plate 48. The faces 72 and 74 are connected by longitudinal arcuate faces 76 and the edges 70 and 72 are connected by arcuate edges 78. The faces 76 and edges 78 are spaced far enough from each other so they will not engage each other during brake application.

Figure 7:
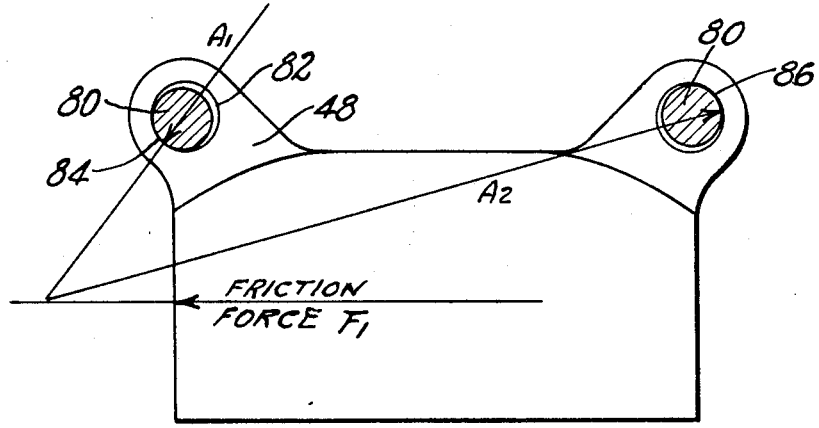
FIGURE 7 is a view of a brake shoe and mounting means therefor of the prior art showing force distribution.

With relation to FIGURE 7, there is illustrated an embodiment of the prior art wherein the brake shoe with openings 82, is attached to two round rods 80. The fit between the rods 80 and openings 82 illustrates exaggerated tolerances. No matter how closely the tolerances are kept, a perfect fit between a round rod and a round opening is almost unattainable. The value of the force exerted on each rod is determined by the point of contact between the edges of the openings 82 and the rods 80 for anchoring thereagainst. Because a perfect match between the round openings 82 and round rods 80 are almost unobtainable, the brake shoes may anchor at different areas on the rods for different sets of brakes and, therefore, one is not certain how much force each rod 80 will be forced to take on an application of the brake; resulting in overdesign of the rods 82 or if the rods are underdesigned, bending or failure of the rods will result. Assuming that the rotor is rotating in a counterclockwise direction the edge of the openings 82 could possibly abut against the rods 80 at 84 and at 86 with the resultant forces meeting at a point outside the boundary of the backing plate 48.

Figure 8:
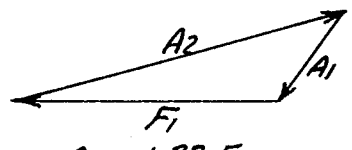
FIGURE 8 is a force diagram of FIGURE 7.

FIGURE 8 illustrates a force diagram of the force distribution of FIGURE 7 and it is shown that the force $A_1$ exerted on one of the rods 80 is equal to .44 of the resultant force $F_1$ and the reaction force $A_2$ exerted on the other of the rods is equal to 1.32 of the resultant force $F_1$, which is approximately three times the amount of force exerted on the other rod. While this is illustrative of one example of a nonperfect match between the rods and their respective openings, the value of force exerted on each set of rods in different brakes will vary depending on the nonperfect fits.

Figure 9:
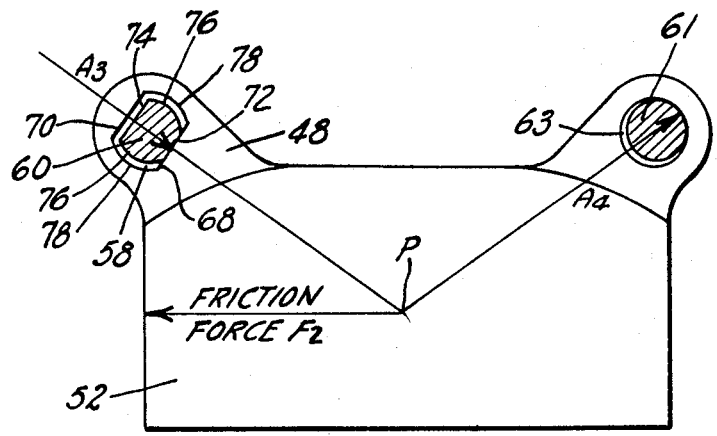
FIGURE 9 is a view of a brake shoe and the mounting means therefor of the present invention showing force distribution.
Figure 10:
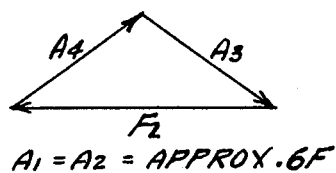
FIGURE 10 is a force diagram of FIGURE 9.

With reference to FIGURE 9, there is illustrated applicant's construction exaggerating tolerances, and how the forces are distributed to each rod 60 and 61. Assuming that the rotor 11 is moving in a counterclockwise direction, then upon engagement of the friction pad 52 with the rotor, the brake shoe 44 will tend to move toward the left with the reaction being taken by the rods 60 and 61. The edge 68 of the opening 58 and the face 72 of the rod will always fully engage each other upon counterclockwise rotation of the rotor since the rod 60 is free to rotate. The resultant reaction exerted by the rod 60 will therefore be in a line perpendicular to the edge 68. The edges 68 and 70 of the opening 58 are at such an angle on the backing plate that the line of resultant force $A_3$, transmitted by the rod 60 which is generally perpendicular to the edges 68, 70 will pass generally through a point P aligned with the center of pressure exerted by the piston 69 on the brake shoe and through which the resultant frictional force $F_2$, exerted by the rotor on the brake shoe passes. Once the direction of force $A_3$ exerted on rod 60 is determined, the direction of the force $A_4$ exerted on the rod 61 is determined and will pass generally through the aforementioned point that $A_3$ passes through. As shown in FIGURE 10, the force $A_3$ exerted on rod 60 equals the force $A_4$ exerted on rod 61 which each equal approximately .66 of the resultant force $F_2$.

The advantage of this construction, over former constructions, wherein two round rods and two round openings in the backing plate are used is that many close tolerances heretofore required may be dispensed with and equal force on each rod is assured. All that is necessary is that one rod 60 be pivotable and have parallel faces for engaging edges 68 and 70 of opening 58 of the backing plate and that the edges 68 and 70 be at the proper angle wherein the reaction force exerted on the rod 60 will pass generally through a point P aligned with the center of pressure exerted by the piston on the brake shoe and the point wherein the resultant frictional force, exerted by the disk on the shoe, passes. Also, the end edges 76 of the rod 60 and faces 78 of the opening must be spaced from each other to allow for sliding movement of the backing plate 48 relative to the rod 60 so the edge 68 and face 72 will always fully engage each other on counterclockwise rotation of the rotor and edge 70 and face 74 will always fully engage each other on clockwise rotation of the rotor. When these conditions are met, the resultant forces transmitted to the rods are substantially equal to each other at all times during each brake actuation of different sets of brakes.

It will be apparent that the objects heretofore enumerated, as well as others, have been achieved. While the invention has been described in considerable detail, I do not wish to be limited to the particular construction shown and described; and it is my intention to cover hereby all novel adaptations, modifications and arrangements thereof, which come within the process of those skilled in the art to which the invention relates and which come within the scope of the following claims.

I claim:

1. In a disk brake: a rotor having friction faces thereon, a housing straddling said rotor and having a pair of circumferentially spaced bearing portions on one side of said rotor, a support member, and two links, each link being pivotally mounted independently of each other at one end on said support member about an axis generally parallel to the plane of said rotor friction faces, and means connecting the other end of each link to a respective one of said circumferentially spaced bearing portions of said housing for relative rotation therebetween about at least two axes which intersect.

2. In a disk brake: a rotor having friction faces thereon, a housing straddling said rotor and having a pair of circumferentially spaced bearing portions on one side of said rotor, a support member, and two links, each link being pivotally mounted independently of each other at one end on said support member about an axis generally parallel to the plane of said rotor friction faces, the other end of each said link being closely adjacent a respective one of said circumferentially spaced bearing portions of said housing, and bearing means including a bearing member shaped as a sector of a sphere and a seat therefor operably connecting each of said other ends of said links to their respective bearing portions of said housing whereby said housing is rotatable relative to said links and said support member about at least two axes which intersect.

3. The structure recited in claim 2 further including means for adjusting at least one axial link along its axis of rotation.

4. The structure recited in claim 2 further including sealing means extending between said housing and each link and encompassing said bearing member and seat.

5. In a disk brake: a rotor having friction faces thereon, a housing straddling said rotor and having a pair of circumferentially spaced bearing portions on one side of said rotor, a support member, and two links, each link being pivotally mounted independently of each other at one end on said support member about an axis generally parallel to the plane of said rotor friction faces, each said circumferentially spaced bearing portion of said housing having an opening therein, the other end of each link having a sector of a sphere shaped bearing member extending into said opening with the spherical portion of said bearing member engaging the wall and bottom surface of said opening whereby said housing is rotatable relative to said links and said support member about at least two axes which intersect.

References Cited by the Examiner

UNITED STATES PATENTS

| | | | |
|---|---|---|---|
| 2,382,870 | 8/1945 | Gaenssle et al. | 188—205 |
| 2,988,176 | 6/1961 | DuBois | 188—73 |
| 2,999,565 | 9/1961 | Evans | 188—72 |
| 3,051,272 | 8/1962 | Burnett | 188—73 |
| 3,088,554 | 5/1963 | Desvignes et al. | 188—73 |

FOREIGN PATENTS

| | | |
|---|---|---|
| 1,129,639 | 9/1956 | France. |
| 1,239,953 | 7/1960 | France. |
| 1,267,300 | 6/1961 | France. |
| 730,053 | 5/1955 | Great Britain. |
| 878,314 | 9/1961 | Great Britain. |

MILTON BUCHLER, *Primary Examiner.*

EUGENE G. BOTZ, ARTHUR L. LA POINT,
*Examiners.*

F. B. HENRY, G. E. A. HALVOSA, *Assistant Examiners.*